(12) United States Patent
Giardino et al.

(10) Patent No.: US 10,477,883 B2
(45) Date of Patent: Nov. 19, 2019

(54) GAS INJECTION ASSEMBLIES FOR BATCH BEVERAGES HAVING SPARGERS

(71) Applicant: Cornelius, Inc., Saint Paul, MN (US)

(72) Inventors: Nicholas M. Giardino, Gilberts, IL (US); Tomasz K. Kasprzycki, Carpentersville, IL (US); Jacob Lukjanowicz, Lockport, IL (US); Jose Renteria, Chicago, IL (US); Michael Kurtz, Saint Charles, IL (US)

(73) Assignee: Cornelius, Inc., Saint Paul, MN (US)

( * ) Notice: Subject to any disclaimer, the term of this patent is extended or adjusted under 35 U.S.C. 154(b) by 488 days.

(21) Appl. No.: 15/247,215

(22) Filed: Aug. 25, 2016

(65) Prior Publication Data

US 2017/0055553 A1   Mar. 2, 2017

Related U.S. Application Data

(60) Provisional application No. 62/367,928, filed on Jul. 28, 2016, provisional application No. 62/339,528, (Continued)

(51) Int. Cl.
*A23L 2/54* (2006.01)
*B01F 3/04* (2006.01)
*B01F 5/04* (2006.01)

(52) U.S. Cl.
CPC ............ *A23L 2/54* (2013.01); *B01F 3/04021* (2013.01); *B01F 3/04106* (2013.01);
(Continued)

(58) Field of Classification Search
CPC .......... A23L 2/54; B01F 3/04; B01F 3/04099; B01F 3/04106; B01F 3/04021; B01F 3/04262; B01F 2003/04382; B01F 5/04
(Continued)

(56) References Cited

U.S. PATENT DOCUMENTS

| 1,365,183 A | 1/1921 | Moffatt |
| 1,561,036 A | 11/1925 | Sugden |

(Continued)

FOREIGN PATENT DOCUMENTS

| CA | 2005959 | 6/1990 |
| CN | 1060073 | 4/1992 |

(Continued)

OTHER PUBLICATIONS

International Search Report and Written Opinion, PCT/US2017/014665, dated Jun. 6, 2017.

(Continued)

*Primary Examiner* — Robert A Hopkins
(74) *Attorney, Agent, or Firm* — Andrus Intellectual Property Law, LLP

(57) ABSTRACT

A gas injection assembly for injecting a gas into a liquid to form a solution includes a vessel that receives the liquid, a flow channel that conveys the liquid from the vessel through an upstream inlet to a downstream outlet that is configured to dispense the solution, and a sparger having a porous surface positioned in the flow channel such that the liquid flows across the porous surface and the porous surface injects the gas into the liquid as the liquid flows across the porous surface.

16 Claims, 7 Drawing Sheets

Related U.S. Application Data filed on May 20, 2016, provisional application No. 62/241,928, filed on Oct. 15, 2015, provisional application No. 62/209,701, filed on Aug. 25, 2015, provisional application No. 62/211,414, filed on Aug. 2, 2015.

(52) U.S. Cl.
CPC ...... *B01F 3/04262* (2013.01); *B01F 3/04503* (2013.01); *B01F 3/04787* (2013.01); *B01F 5/04* (2013.01); *B01F 5/0465* (2013.01)

(58) Field of Classification Search
USPC .................................................. 261/76, 77
See application file for complete search history.

(56) References Cited

U.S. PATENT DOCUMENTS

| | | | |
|---|---|---|---|
| 1,960,640 A | 5/1934 | Lajeunesse | |
| 2,006,313 A | 6/1935 | Geddes | |
| 2,170,531 A | 8/1939 | Kahn | |
| 2,209,054 A | 7/1940 | Doud et al. | |
| 2,556,038 A | 6/1951 | Kollsman | |
| 2,620,107 A | 12/1952 | Tolan | |
| 3,113,871 A | 12/1963 | Webster | |
| 3,397,871 A | 8/1968 | Hasselberg | |
| 3,417,974 A * | 12/1968 | Glynn | B01F 3/04262 261/122.1 |
| 3,545,731 A | 12/1970 | McManus | |
| 3,582,351 A | 6/1971 | Austin et al. | |
| 3,617,032 A | 11/1971 | Tracy | |
| 3,780,198 A | 12/1973 | Pahl et al. | |
| 3,911,064 A | 10/1975 | McWhirter | |
| 4,124,049 A | 11/1978 | Yamaguchi | |
| 4,171,580 A | 10/1979 | Vabrinskas | |
| 4,181,604 A | 1/1980 | Onishi et al. | |
| 4,208,903 A | 6/1980 | Hopper et al. | |
| 4,251,473 A | 2/1981 | Gilbey | |
| 4,259,360 A | 3/1981 | Venetucci et al. | |
| 4,268,279 A | 5/1981 | Shindo et al. | |
| 4,323,090 A | 4/1982 | Magi | |
| 4,364,493 A | 12/1982 | Raynes et al. | |
| 4,466,342 A | 8/1984 | Basile et al. | |
| 4,481,986 A | 11/1984 | Meyers | |
| 4,517,135 A | 5/1985 | Szerenyi et al. | |
| 4,518,541 A | 5/1985 | Harris | |
| 4,526,298 A | 7/1985 | Boxer et al. | |
| 4,573,967 A | 3/1986 | Hargrove et al. | |
| 4,583,969 A | 4/1986 | Mortensen | |
| 4,610,888 A | 9/1986 | Teng et al. | |
| 4,668,219 A | 5/1987 | Israel | |
| 4,674,958 A | 6/1987 | Igarashi et al. | |
| 4,681,244 A | 7/1987 | Geddie | |
| 4,708,827 A | 11/1987 | McMillin | |
| 4,709,625 A | 12/1987 | Layre et al. | |
| 4,719,056 A | 1/1988 | Scott | |
| 4,739,905 A | 4/1988 | Nelson | |
| 4,759,474 A | 7/1988 | Regunathan et al. | |
| 4,781,889 A | 11/1988 | Fukasawa et al. | |
| 4,785,973 A | 11/1988 | Kobe | |
| 4,808,346 A | 2/1989 | Strenger | |
| 4,808,348 A | 2/1989 | Rudick et al. | |
| 4,815,635 A | 3/1989 | Porter | |
| 4,818,447 A | 4/1989 | Iwasaki | |
| 4,820,269 A | 4/1989 | Riddell | |
| 4,850,269 A | 7/1989 | Hancock et al. | |
| 4,857,350 A | 8/1989 | Iwasaki et al. | |
| 4,869,396 A | 9/1989 | Horino et al. | |
| 4,897,359 A | 1/1990 | Oakley et al. | |
| 4,923,379 A | 5/1990 | Tomminen | |
| 4,927,335 A | 5/1990 | Pensa | |
| 4,927,567 A | 5/1990 | Rudick | |
| 4,940,212 A | 7/1990 | Burton | |
| 4,950,431 A | 8/1990 | Rudick et al. | |
| 4,959,152 A | 9/1990 | Nichols | |
| 4,961,760 A | 10/1990 | Caskey et al. | |
| 4,971,836 A | 11/1990 | Fukasawa et al. | |
| 4,976,894 A | 12/1990 | Robinson | |
| 4,999,140 A | 3/1991 | Sutherland et al. | |
| 5,029,733 A | 7/1991 | Hedderick et al. | |
| 5,034,164 A | 7/1991 | Semmens | |
| 5,037,610 A | 8/1991 | Fukasawa et al. | |
| 5,038,976 A | 8/1991 | McMillin | |
| 5,044,171 A | 9/1991 | Farkas | |
| 5,059,374 A | 10/1991 | Krueger et al. | |
| 5,060,833 A | 10/1991 | Edison et al. | |
| 5,062,548 A | 11/1991 | Hedderick et al. | |
| 5,073,811 A | 12/1991 | Botti et al. | |
| 5,104,158 A | 4/1992 | Meyer et al. | |
| 5,118,009 A | 6/1992 | Novitsky | |
| 5,124,088 A | 6/1992 | Stumphauzer | |
| 5,152,419 A | 10/1992 | Yanagi | |
| 5,156,871 A | 10/1992 | Goulet et al. | |
| 5,192,513 A | 3/1993 | Stumphauzer et al. | |
| 5,222,308 A | 6/1993 | Barker et al. | |
| 5,232,601 A | 8/1993 | Chu et al. | |
| 5,254,143 A | 10/1993 | Anazawa et al. | |
| 5,260,081 A | 11/1993 | Stumphauzer et al. | |
| 5,287,636 A | 2/1994 | Lafleur et al. | |
| 5,294,338 A | 3/1994 | Kamo et al. | |
| 5,299,715 A | 4/1994 | Feldman | |
| 5,304,130 A | 4/1994 | Button et al. | |
| 5,306,242 A | 4/1994 | Joyce et al. | |
| 5,353,963 A | 10/1994 | Gorski | |
| 5,358,142 A | 10/1994 | Holmes | |
| 5,366,625 A | 11/1994 | Pedersen et al. | |
| 5,380,433 A | 1/1995 | Etienne et al. | |
| 5,419,461 A | 5/1995 | Goulet | |
| 5,460,846 A | 10/1995 | Stumphauzer et al. | |
| 5,509,349 A | 4/1996 | Anderson et al. | |
| 5,510,194 A | 4/1996 | Hendricks et al. | |
| 5,515,687 A | 5/1996 | Arriulou | |
| 5,531,254 A | 7/1996 | Rosenbach | |
| 5,549,037 A | 8/1996 | Stumphauzer et al. | |
| 5,565,149 A | 10/1996 | Page et al. | |
| 5,588,984 A | 12/1996 | Verini | |
| 5,592,867 A | 1/1997 | Walsh et al. | |
| 5,634,571 A | 6/1997 | Cataneo et al. | |
| D384,731 S | 10/1997 | Ramacier, Jr. et al. | |
| 5,674,433 A | 10/1997 | Semmens et al. | |
| 5,779,897 A | 7/1998 | Kalthod et al. | |
| 5,792,391 A | 8/1998 | Vogel et al. | |
| 5,826,432 A | 10/1998 | Ledbetter | |
| 5,882,717 A | 3/1999 | Panesar et al. | |
| 5,980,959 A | 11/1999 | Frutin | |
| 6,041,970 A | 3/2000 | Vogel | |
| 6,073,811 A | 6/2000 | Costea | |
| 6,082,401 A | 7/2000 | Braun et al. | |
| 6,092,811 A | 7/2000 | Bojarczuk et al. | |
| 6,098,849 A | 8/2000 | McInnes | |
| 6,138,995 A | 10/2000 | Page | |
| 6,155,781 A | 12/2000 | Tsai | |
| 6,167,718 B1 | 1/2001 | Halimi et al. | |
| 6,209,855 B1 | 4/2001 | Glassford | |
| 6,216,961 B1 | 4/2001 | Utter et al. | |
| 6,235,641 B1 | 5/2001 | Christenson | |
| 6,439,549 B1 | 8/2002 | Loov | |
| 6,481,642 B1 | 11/2002 | Louis, Jr. et al. | |
| 6,530,400 B2 | 3/2003 | Nelson | |
| 6,688,019 B2 | 2/2004 | Buchweitz | |
| 6,719,175 B2 | 4/2004 | MacKenzie | |
| 6,749,090 B2 | 6/2004 | Bailey | |
| 6,755,047 B2 | 6/2004 | Kreutzmann et al. | |
| 6,869,081 B1 | 3/2005 | Jenco | |
| 7,048,262 B2 | 5/2006 | Cheng | |
| 7,073,688 B2 | 7/2006 | Choi et al. | |
| 7,086,431 B2 | 8/2006 | D'Antonio et al. | |
| 7,104,531 B2 | 9/2006 | Page et al. | |
| 7,114,707 B2 | 10/2006 | Rona et al. | |
| 7,255,353 B2 | 8/2007 | Caplain et al. | |
| 7,267,247 B1 | 9/2007 | Crunkleton, III et al. | |
| 7,361,164 B2 | 4/2008 | Simpson et al. | |
| 7,407,154 B2 | 8/2008 | Sakakibara et al. | |

(56) References Cited

U.S. PATENT DOCUMENTS

| | | |
|---|---|---|
| 7,487,888 B1 | 2/2009 | Pierre, Jr. |
| 7,520,925 B2 | 4/2009 | Sisk et al. |
| 7,533,786 B2 | 5/2009 | Woolfson et al. |
| 7,717,294 B2 | 5/2010 | Bodemann |
| 7,784,651 B2 | 8/2010 | Batschied et al. |
| 7,806,299 B2 | 10/2010 | Wauters |
| 8,024,870 B1 | 9/2011 | Ballentine et al. |
| 8,158,001 B2 | 4/2012 | Taylor et al. |
| 8,348,245 B2 | 1/2013 | Fischer |
| 8,356,422 B1 | 1/2013 | Ballentine et al. |
| 8,438,969 B2 | 5/2013 | Gold |
| 8,544,688 B2 | 10/2013 | Ballentine |
| 8,603,805 B2 | 12/2013 | Goodwin et al. |
| 8,622,249 B1 | 1/2014 | Ballentine |
| 8,840,092 B2 | 9/2014 | Kumar et al. |
| 8,857,797 B2 | 10/2014 | Kumar et al. |
| 8,882,084 B2 | 11/2014 | Malagi et al. |
| 8,912,684 B2 | 12/2014 | Stahlkopf et al. |
| 8,997,633 B2 | 4/2015 | Bishop et al. |
| 9,107,449 B2 | 8/2015 | Njaastad et al. |
| 9,114,368 B2 | 8/2015 | Njaastad et al. |
| 9,339,056 B2 | 5/2016 | Njaastad |
| 9,346,024 B2 | 5/2016 | Page et al. |
| 9,386,782 B2 | 7/2016 | Choi et al. |
| 9,497,978 B2 | 11/2016 | Modak et al. |
| 9,623,383 B1 | 4/2017 | Kleinrichert |
| 9,718,035 B2 | 8/2017 | Bandixen et al. |
| 9,801,405 B2 | 10/2017 | Kleinrichert |
| 10,017,373 B2 | 7/2018 | Kleinrichert |
| 10,182,587 B2 | 1/2019 | Lundberg et al. |
| 2002/0074369 A1 | 6/2002 | Forsman et al. |
| 2003/0075573 A1 | 4/2003 | Bailey |
| 2004/0045980 A1 | 3/2004 | Robins |
| 2004/0112455 A1 | 6/2004 | Nelson |
| 2004/0118942 A1 | 6/2004 | Courtney |
| 2004/0244216 A1 | 12/2004 | Poole |
| 2004/0262331 A1 | 12/2004 | Woolfson et al. |
| 2005/0001340 A1 | 1/2005 | Page |
| 2005/0251090 A1 | 11/2005 | Hoskins |
| 2006/0016511 A1 | 1/2006 | Chantalat |
| 2006/0112717 A1 | 6/2006 | Walton |
| 2006/0163140 A1 | 7/2006 | Taylor et al. |
| 2006/0270036 A1 | 11/2006 | Goodwin et al. |
| 2007/0065555 A1 | 3/2007 | Soane et al. |
| 2007/0090135 A1 | 4/2007 | Benham |
| 2007/0158371 A1 | 7/2007 | Lupfer |
| 2007/0261263 A1 | 11/2007 | Lee |
| 2007/0278145 A1 | 12/2007 | Taylor et al. |
| 2008/0148959 A1 | 6/2008 | Bockbrader |
| 2008/0304356 A1 | 12/2008 | Zhuang |
| 2009/0236361 A1 | 9/2009 | Doelman et al. |
| 2010/0065584 A1 | 3/2010 | Berger |
| 2010/0083843 A1 | 4/2010 | Denisart et al. |
| 2010/0096040 A1 | 4/2010 | Litto |
| 2010/0133708 A1 | 6/2010 | Fischer |
| 2010/0203209 A1 | 8/2010 | Fishbein |
| 2010/0213223 A1 | 8/2010 | Ballentine |
| 2010/0218686 A1 | 8/2010 | O'Brien et al. |
| 2011/0020508 A1 | 1/2011 | Santoiemmo |
| 2011/0041543 A1 | 2/2011 | Tachibana et al. |
| 2011/0097466 A1 | 4/2011 | Vastardis |
| 2011/0113972 A1 | 5/2011 | Tatera |
| 2011/0115103 A1 | 5/2011 | Tatera |
| 2011/0180565 A1 | 7/2011 | Racino et al. |
| 2011/0226343 A1 | 9/2011 | Novak et al. |
| 2011/0300275 A1 | 12/2011 | Lackey et al. |
| 2012/0038068 A1 | 2/2012 | Bormes et al. |
| 2012/0098148 A1 | 4/2012 | Koslow et al. |
| 2012/0177784 A1 | 7/2012 | Malagi et al. |
| 2012/0292790 A1 | 11/2012 | Tatera |
| 2013/0106690 A1 | 5/2013 | Lim |
| 2013/0196031 A1 | 8/2013 | Criezis et al. |
| 2013/0270722 A1 | 10/2013 | Phillips et al. |
| 2014/0099405 A1 | 4/2014 | Boarman et al. |
| 2014/0113045 A1 | 4/2014 | Njaastad et al. |
| 2014/0220207 A1 | 8/2014 | Page |
| 2014/0255574 A1 | 10/2014 | Njaastad et al. |
| 2014/0302212 A1 | 10/2014 | Njaastad |
| 2015/0329343 A1 | 11/2015 | Kleinrchert |
| 2016/0136590 A1 | 5/2016 | Campbell |
| 2016/0280528 A1 | 9/2016 | Kleinrichert |
| 2016/0289617 A1 | 10/2016 | MacKenzie et al. |
| 2017/0055552 A1 | 3/2017 | Giardino et al. |
| 2017/0064977 A1 | 3/2017 | Bischel |
| 2017/0164643 A1 | 6/2017 | Lundberg et al. |
| 2017/0233235 A2 | 8/2017 | Kleinrichert |
| 2017/0265499 A1 | 9/2017 | Hyde et al. |
| 2017/0326508 A1 | 11/2017 | Bandixen et al. |
| 2017/0367376 A1 | 12/2017 | Kleinrichert |
| 2018/0098658 A1 | 4/2018 | Angell et al. |
| 2018/0213824 A1 | 8/2018 | Schact et al. |
| 2018/0282144 A1 | 10/2018 | Kleinrichert |
| 2018/0362906 A1 | 12/2018 | Osborn |

FOREIGN PATENT DOCUMENTS

| | | |
|---|---|---|
| CN | 2134366 | 5/1993 |
| CN | 1197029 | 10/1998 |
| CN | 1326380 | 12/2001 |
| CN | 1537028 | 10/2004 |
| CN | 1856687 | 11/2006 |
| CN | 103025644 | 4/2013 |
| CN | 2013123868 | 8/2013 |
| CN | 103282304 | 9/2013 |
| CN | 104039431 | 9/2014 |
| DE | 20112974 | 9/2002 |
| DE | 602004003627 | 10/2007 |
| DE | 102008012486 | 9/2009 |
| DE | 102010012175 | 9/2011 |
| EP | 0132913 | 2/1988 |
| EP | 0470377 | 2/1992 |
| EP | 0732142 | 9/1996 |
| EP | 0745329 | 12/1996 |
| EP | 0873966 | 10/1998 |
| EP | 1092674 | 4/2001 |
| EP | 1480906 | 12/2004 |
| EP | 1480908 | 12/2004 |
| EP | 1662218 | 5/2006 |
| EP | 2070587 | 6/2009 |
| EP | 2719450 | 4/2014 |
| EP | 2571803 | 3/2017 |
| FR | 2684088 | 5/1993 |
| GB | 694918 | 7/1953 |
| GB | 2247225 | 2/1992 |
| GB | 2333282 | 7/1999 |
| GB | 2340415 | 2/2000 |
| GB | 2358145 | 7/2001 |
| GB | 2496010 | 5/2013 |
| GB | 2526735 | 2/2015 |
| KR | 20140035878 | 3/2014 |
| TW | 201446197 | 12/2014 |
| WO | 199529130 | 11/1995 |
| WO | 0187472 A1 | 11/2001 |
| WO | 2003066509 | 12/2003 |
| WO | 2009026541 | 2/2009 |
| WO | 2009077681 A1 | 6/2009 |
| WO | 2009077682 A2 | 6/2009 |
| WO | 2011134926 | 11/2011 |
| WO | 2011134928 | 11/2011 |
| WO | 2012100333 | 8/2012 |
| WO | 2012162762 A1 | 12/2012 |
| WO | 2014138667 | 9/2014 |
| WO | 2014183185 | 11/2014 |
| WO | 2015061564 | 4/2015 |
| WO | 2015075020 | 5/2015 |
| WO | 2015119204 | 8/2015 |
| WO | 2015124590 | 8/2015 |
| WO | 2015175244 | 11/2015 |

(56) References Cited

FOREIGN PATENT DOCUMENTS

| WO | 2018023713 | | 2/2018 |
|---|---|---|---|
| WO | 2018185581 | A1 | 10/2018 |

OTHER PUBLICATIONS

International Preliminary Report on Patentability, PCT/US2014/022048, dated Feb. 18, 2015.

International Preliminary Report on Patentability, PCT/US2013/065763, dated Sep. 25, 2014.

ISR and Written Opinion, PCT/US2014/040509, dated Oct. 1, 2014.

GB Examination Report, GB Application No. 1506574.1, dated Mar. 1, 2017.

International Search Report and Written Opinion, PCT/US2017/029052, dated Aug. 21, 2017.

International Preliminary Report of Patentability, PCT/US2014/033040, dated Oct. 15, 2015.

Kycon, Inc., KLDPX-0207-x-DC Power Jack, Panel Mount drawing, Jan. 18, 2008.

Sodastream webpage [online], [retrieved on Oct. 8, 2012] Retrieved from the Internet: <URL:www.sodastream.com/fizz/>, (1 page).

ISi Twist 'N Sparkle Beverage Carbonating System YouTube video [online], isinorthamerica Mar. 23, 2011 [retrieved on Mar. 11, 2014] Retrieved from the Internet: <URL:www.youtube.com/watch?v=ySSXdwTs-cY>, (3 pages).

Perlini Carbonated Cocktail System YouTube video [online] Perlage Systems Jan. 11, 2010 [retrieved on Mar. 11, 2014] Retrieved from the Internet: <URL:www.youtube.com/watch?v=fhle9b4mjC4&feature=relmfu>, (3 pages).

Sodastream, Video Demo [online], [retrieved on Mar. 11, 2014] Retrieved from the Internet: <URL:www.sodastreamusa.com/PopUps/VideoDemo.html>, (1 page).

Fulcher Flow to Use the Soda Stream Jet YouTube Feb. 11, 2012 [retrieved on Feb. 26, 2014] Retrieved from the Internet: <URL:http:www.youtube.com/watch?v=bf9MVEel5XM> entire video, (8 pages).

ISR and Written Opinion PCT/US2014/022048 dated Jun. 27, 2014.

ISR and Written Opinion PCT/US2014/033040 dated Aug. 27, 2014.

ISR and Written Opinion PCT/US2013/065763 dated Mar. 18, 2014.

http://mottcorp.com/sites/default/files/sparger_design_guide.pdf.

Rubesin, MW et al., "The Effect of Fluid Injection on the Compressible Turbulent Boundary Layer: Preliminary Tests on Transpiration Cooling of a Flat Plate at M=2.7 with Air as the Injected Gas", National Advisory Committee for Aeronautics, 1955.

International Search Report and Written Opinion PCT/US2016/048119 dated Nov. 16, 2016.

Mabuchi Motor Co. Ltd., RS-385SH Motor Mounting Drawings, PDF creation date of Aug. 19, 2008.

\* cited by examiner

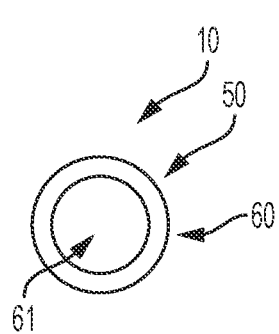
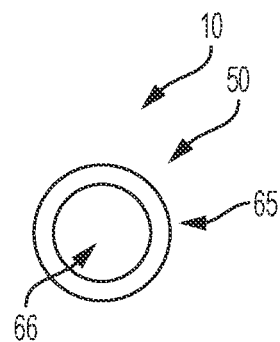
FIG. 9    FIG. 10
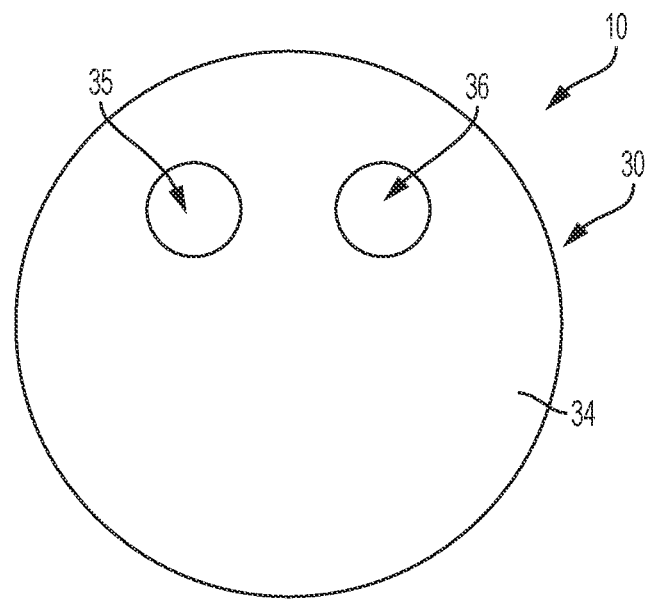
FIG. 11

GAS INJECTION ASSEMBLIES FOR BATCH BEVERAGES HAVING SPARGERS

CROSS-REFERENCE TO RELATED APPLICATIONS

The present application claims priority to U.S. Provisional Application No. 62/367,928 filed on Jul. 28, 2016, U.S. Provisional Application No. 62/339,528 filed on May 20, 2016, U.S. Provisional Application No. 62/241,928, filed on Oct. 15, 2015, U.S. Provisional Application No. 62/211,414, filed on Aug. 2, 2015, and U.S. Provisional Application No. 62/209,701, filed on Aug. 25, 2015, which are hereby incorporated herein by reference.

FIELD

The present disclosure relates to gas injection assemblies for batch beverages, particularly gas injection assemblies having spargers.

BACKGROUND

The following U.S. Patents, U.S. Patent Publication, and U.S. Patent Applications are incorporated herein by reference, in entirety:

U.S. Pat. No. 9,114,368 discloses a batch carbonation apparatus that includes a housing defining a vessel cavity. The housing includes an agitation mechanism. The pressure vessel includes a cap that has a CO2 inlet and a CO2 outlet. The pressure vessel also includes a seal. The pressure vessel is moveable into an out of the vessel cavity. A locking mechanism is provided and is attached to the agitation mechanism to removably lock the cap and seal relative to the pressure vessel. A CO2 source is connected to a plurality of valves where each valve has a differing pressure. A selection toggle is attached to the housing. A control mechanism is coupled to the plurality of valves. A user selects a desired carbonation level using the selection toggle and CO2 is introduced to the pressure vessel at a specified pressure, wherein the agitation mechanism agitates liquid within the pressure vessel forming a carbonated beverage having a selected carbonation level. Also disclosed is a process of forming a carbonated beverage in a batch.

U.S. Pat. No. 9,107,449 discloses a CPU that controls an inlet valve, which connects a tank of pressurized carbon dioxide to a vessel containing the beverage to be carbonized. The tube connecting the tank of pressurized carbon dioxide to the vessel contains an orifice for reducing the carbon dioxide's flow rate, thereby increasing control over the amount of carbon dioxide introduced to the vessel. A motor agitates the vessel, causing the carbon dioxide to become absorbed in the beverage. During the pressurization process, the pressure inside the vessel is monitored by the CPU to determine whether more CO2 should be added to the vessel. An outlet valve causes excess pressure to drain from the vessel. An outlet orifice causes the pressure to release gradually, thus preventing the beverage from foaming.

U.S. Pat. No. 8,882,084 discloses an inline carbonation apparatus that includes a fluid tube having an inner diameter. At least one water orifice is linked to a water source and is attached at one end of the fluid tube. The water orifice atomizes water passing there through. A carbon dioxide source is connected to a carbon dioxide solenoid valve. The carbon dioxide solenoid valve is connected to a carbon dioxide regulator that is coupled to a carbon dioxide orifice and attached to the fluid tube in a spaced relationship from the water orifice. The atomized water has a pressure less than the carbon dioxide such that carbon dioxide is absorbed into the water forming carbonated water having a specified volume of carbonation. The carbon dioxide solenoid valve is opened and closed for a predetermined portion of a drink dispense time providing a volume of carbonated and non-carbonated fluid which upon mixing achieves a desired carbonation level.

U.S. Pat. No. 8,857,797 discloses an inline carbonation apparatus that includes a fluid tube having an inner diameter. At least one water orifice is linked to a water source and is attached to one end of the fluid tube. The water orifice includes a plurality of holes atomizing water that passes there through. A carbon dioxide orifice is linked to a carbon dioxide source and is attached to the fluid tube in a spaced relationship from the water orifice. The atomized water has a pressure less than the carbon dioxide such that carbon dioxide is absorbed into the water forming carbonated water having a specified volume of carbonation.

U.S. Pat. No. 8,840,092 discloses an inline carbonation apparatus that includes a fluid tube having an inner diameter. A water flow control module is connected to a water source. At least one water orifice is linked to the water flow control module and is attached at one end of the fluid tube. The water orifice includes a plurality of holes atomizing water passing there through. A carbon dioxide source is connected to a carbon dioxide valve. The carbon dioxide solenoid valve is connected to a carbon dioxide regulator that is coupled to a carbon dioxide orifice and attached to the fluid tube in a spaced relationship from the water orifice. The atomized water has a pressure less than the carbon dioxide such that carbon dioxide is absorbed into the water forming carbonated water having a specified volume of carbonation. The water control module regulates a water flow rate into the inline carbonation apparatus.

U.S. Pat. No. 5,792,391 discloses a carbonator comprising a tube cylinder having a closed and an open end. A disk is removably retained in the open end for providing access into the interior volume thereof. The disk provides for mounting thereto of water and carbon dioxide gas inlets, a carbonated water outlet, a safety relief valve and a water level sensor. A rigid retaining wire is bent into a square configuration wherein radiused corners thereof cooperate with slots in the open end of the cylinder to retain the disk therein. Manipulation of the retaining wire provides for removal of the disk from the cylinder when the carbonator is not pressurized.

U.S. Pat. No. 5,515,687 discloses an apparatus for providing carbonating of water. The apparatus includes a carbonating tank having a carbon dioxide inlet, a water inlet, and a carbonated water outlet. The carbonating tank is pivotally mounted to a rigid structure and connected to an electric motor for providing an undulating or rocking motion of the carbonator about its pivot mounting. The motion of the carbonating tank provides for carbonating of the water held therein.

U.S. Pat. No. 5,419,461 discloses a narrow profile substantially flat carbonator, consisting of a pair of cold drawn sheet metal halves. Each half defines corresponding alternating seams and ridges and are welded together around a perimeter thereof and along each corresponding seam. When both halves are welded together the ridges define an interior plurality of vertical interior columns, which columns are fluidly interconnected with top and bottom interior channels. The channel includes a pressure relief valve, a carbon dioxide inlet fitting, a water inlet fitting, and a level sensor fitting for retaining a level sensor. A plurality of carbonated water lines extend from the bottom of the carbonator and up along and closely adjacent a side of the carbonator. The carbonated water lines terminate at a point above the carbonator and provide for direct securing to a beverage dispensing valve. The carbonator is preferably of the integral type and held within the water tank of an ice bank type dispenser or within the ice bin of a cold plate cooled dispenser.

U.S. Pat. No. 5,038,976 discloses a beverage dispensing head and a method of dispensing that provides increased carbonation in a dispensed fountain beverage. The dispensing head has a discrete carbonated water decompression chamber in-between an upstream volumetric flow control and a downstream normally closed valve. The method includes the steps of propelling carbonated water through a flow control and then decompressing the carbonated water before it reaches the normally closed valve.

U.S. Pat. No. 4,708,827 discloses a method of and apparatus for making and dispensing carbonated water. A double diaphragm continuous delivery pneumatic liquid pump has a water pressure regulator on a water inlet line to the pump, a water fill line to a carbonator, a propellant exhaust line from the pump to the carbonator, a carbon dioxide line to the carbonator, and a gas pressure regulator for controlling the storage pressure in the carbonator and the exhaust back pressure in the pump propellant outlet. The exhaust back pressure is kept higher than the water pressure at the pump preventing diaphragm inversion.

U.S. Pat. No. 3,617,032 discloses a carbonator or carbonator-blender for producing and storing carbonated water or an admixture of carbonated water and syrup. An open-top bowl is disposed within a cylindrical carbon dioxide-pressurized chamber formed within a pressure tank. A nozzle is provided within the chamber for directing a conical stream of pressurized water into the bowl and another nozzle directs a stream of syrup against the side of the water stream. The bowl is provided with an abutment to produce a swirling action of the water and syrup there within and an aperture is formed in the bottom of the bowl for draining the admixture of water and syrup into the lower portion of the chamber.

U.S. Patent Application Publication No. 2014/0302212 discloses a carbonation apparatus that includes a pressure vessel having a cap with a gas inlet and a gas outlet. The carbonation device also includes a seal. The seal includes a labyrinth preventing contact of a liquid within the pressure vessel with the cap during a carbonation process. A locking mechanism removably locks the cap and seal and antifoam device relative to the pressure vessel.

Pending U.S. patent application Ser. No. 15/138,643 filed on Apr. 26, 2016 discloses batch dissolution assemblies comprising a pressure vessel having an open end and being configured to contain a beverage to be carbonated and a flexible seal that covers the open end of the pressure vessel.

SUMMARY

This Summary is provided to introduce a selection of concepts that are further described herein in the Detailed Description. This Summary is not intended to identify key or central features from the claimed subject matter, nor is it intended to be used as an aid in limiting the scope of the claimed subject matter.

In certain examples, a gas injection assembly for injecting a gas into a liquid to form a solution includes a vessel that receives the liquid, a flow channel that conveys the liquid from the vessel through an upstream inlet to a downstream outlet that dispenses the solution, and a sparger having a porous surface positioned in the flow channel such that the liquid flows across the porous surface and the porous surface injects the gas into the liquid as the liquid flows across the porous surface.

In certain examples, a gas injection assembly for injecting a gas into a liquid to form a solution includes a first vessel that receives the liquid, a second vessel, a flow channel that conveys the liquid from the first vessel through an upstream inlet to a downstream outlet that dispenses the solution into the second vessel, and a sparger having a porous surface positioned in the flow channel such that liquid flows across the porous surface and the porous surface injects the gas into the liquid as the liquid flows across the porous surface.

In certain examples, a method for injecting a gas into a liquid to form a solution includes receiving the liquid in a vessel, conveying the liquid from the vessel through a flow channel from an upstream inlet and a downstream outlet, and injecting gas into the liquid with a sparger having a porous surface positioned in the flow channel such that the porous surface injects the gas into the liquid as the liquid flows across the porous surface.

BRIEF DESCRIPTION OF THE DRAWINGS

The present disclosure is described with reference to the following Figures. The same numbers are used throughout the Figures to reference like features and like components.

FIG. 9 is a bottom view of an example intake member.

FIG. 10 is a bottom view of an example dispensing member.

FIG. 11 is a bottom view of an example top cap.

DETAILED DESCRIPTION

In the present disclosure, certain terms have been used for brevity, clarity and understanding. No unnecessary limitations are to be inferred therefrom beyond the requirement of the prior art because such terms are used for descriptive purposes only and are intended to be broadly construed. The different apparatuses and methods described herein may be used alone or in combination with other apparatuses and methods. Various equivalents, alternatives and modifications are possible within the scope of the appended claims.

Through research and experimentation, the present inventors have developed a machine configured to quickly and effectively inject a gas into a liquid to form a solution (e.g. a consumable flavored beverage). The machine can inject gas (e.g. nitrogen and/or carbon dioxide) alone or in combination as a mixed gas composition into the liquid through a gas injection device. The concentration of a gas and/or the ratio of the mixed gas composition to be injected into the liquid can be adjusted to various levels. As described in the above-incorporated U.S. Patent Applications and U.S. Patents, an operator can place a liquid (such as a beverage including but not limited to water, flavoring syrups, and additives) into a vessel and convey the liquid to the gas injection device where a sparger injects the gas into the liquid to form a solution.

The examples described and depicted in this disclosure can be utilized in combination with the apparatuses and machines disclosed in the above incorporated U.S. Patents, U.S. Patent Publication, and U.S. Patent Applications.

Figure 1:
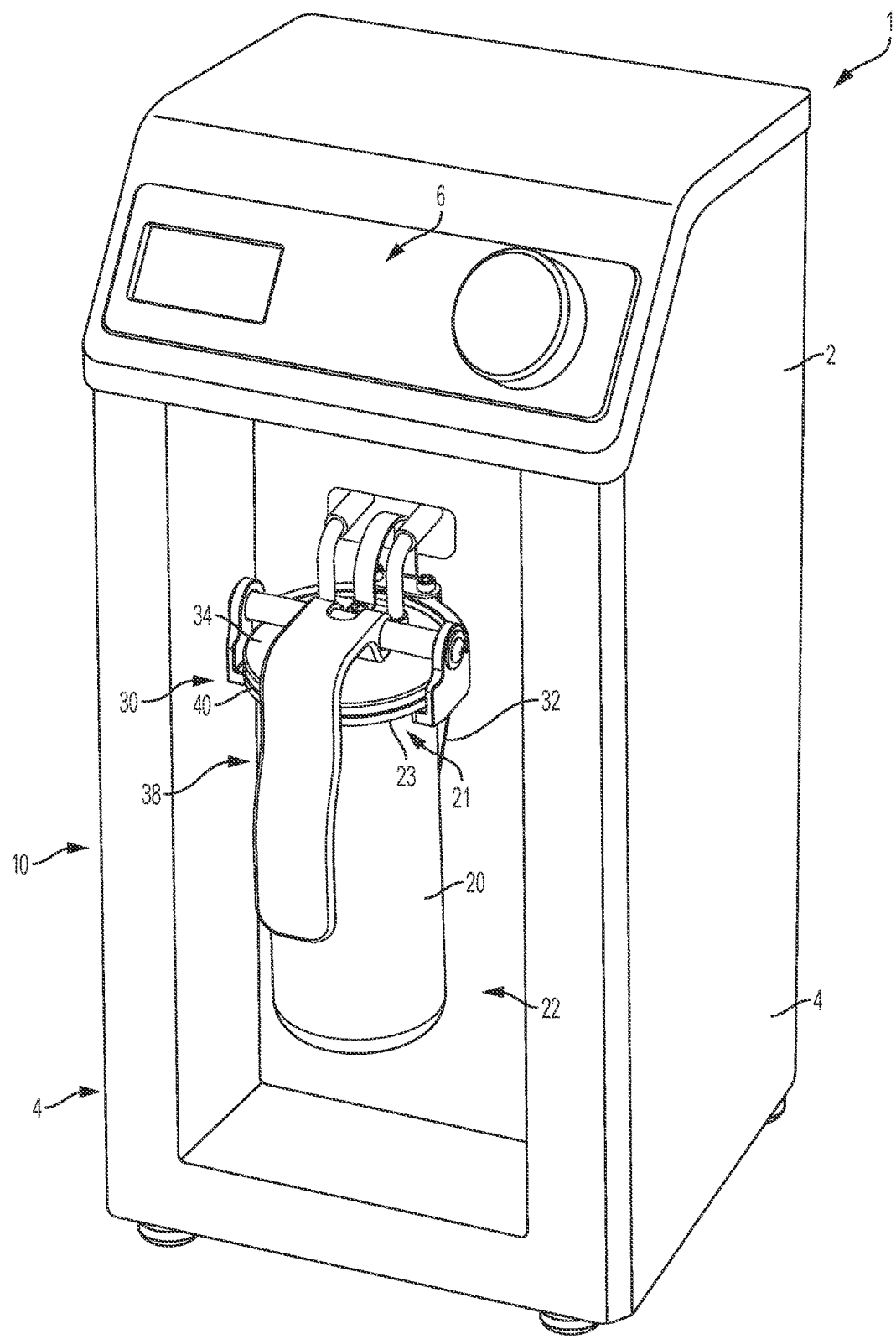
FIG. 1 is an example gas injection machine for batch beverages.
Figure 3:
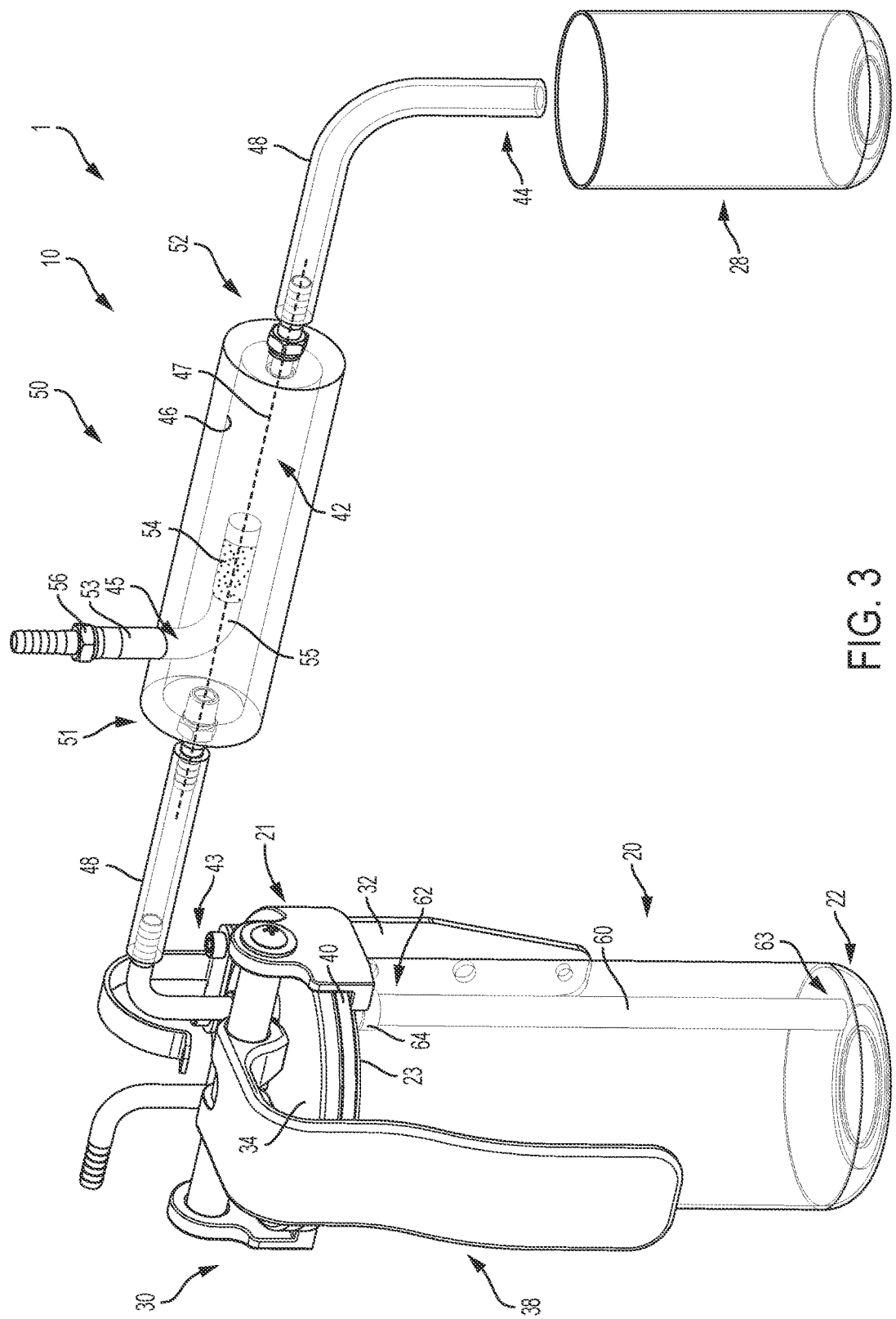
FIG. 3 is an example gas injection assembly with an intake member and without a dispensing member.
Figure 4:
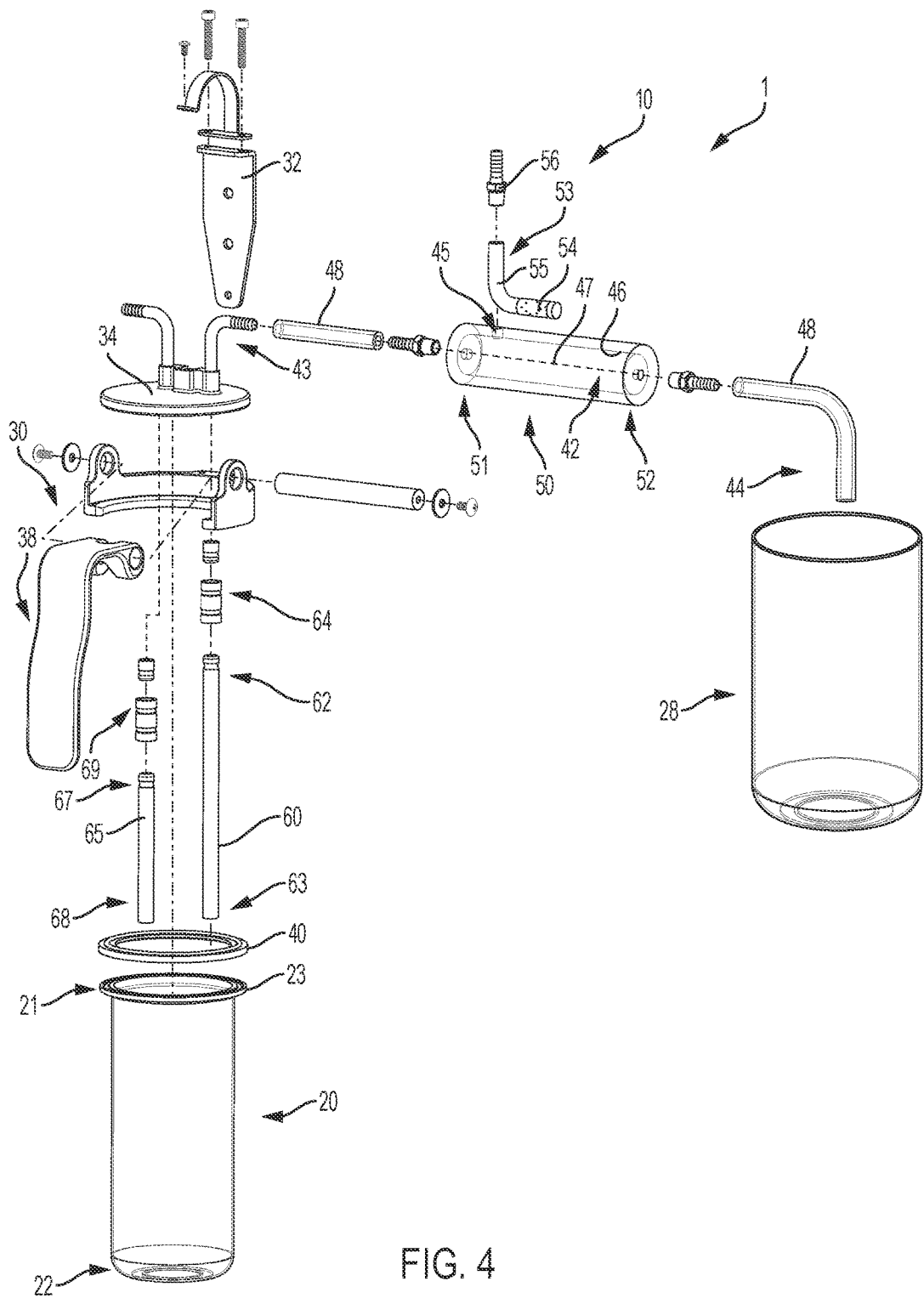
FIG. 4 is an exploded view of the gas injection assembly of FIG. 3 with the intake member and the dispensing member.

Referring to FIG. 1, a beverage machine 1 includes a housing 2, an operator input device 6 configured to receive an input from an operator, and a gas injection assembly 10 configured to inject a gas or mixed gas into a liquid to form a batch or single serve beverage or solution (FIG. 1 depicts a portion of the gas injection assembly 10; see also FIGS. 3 and 4 for an example gas injection assembly 10). The housing 2 includes side panels 4, and a rear panel (not shown).

Figure 2:
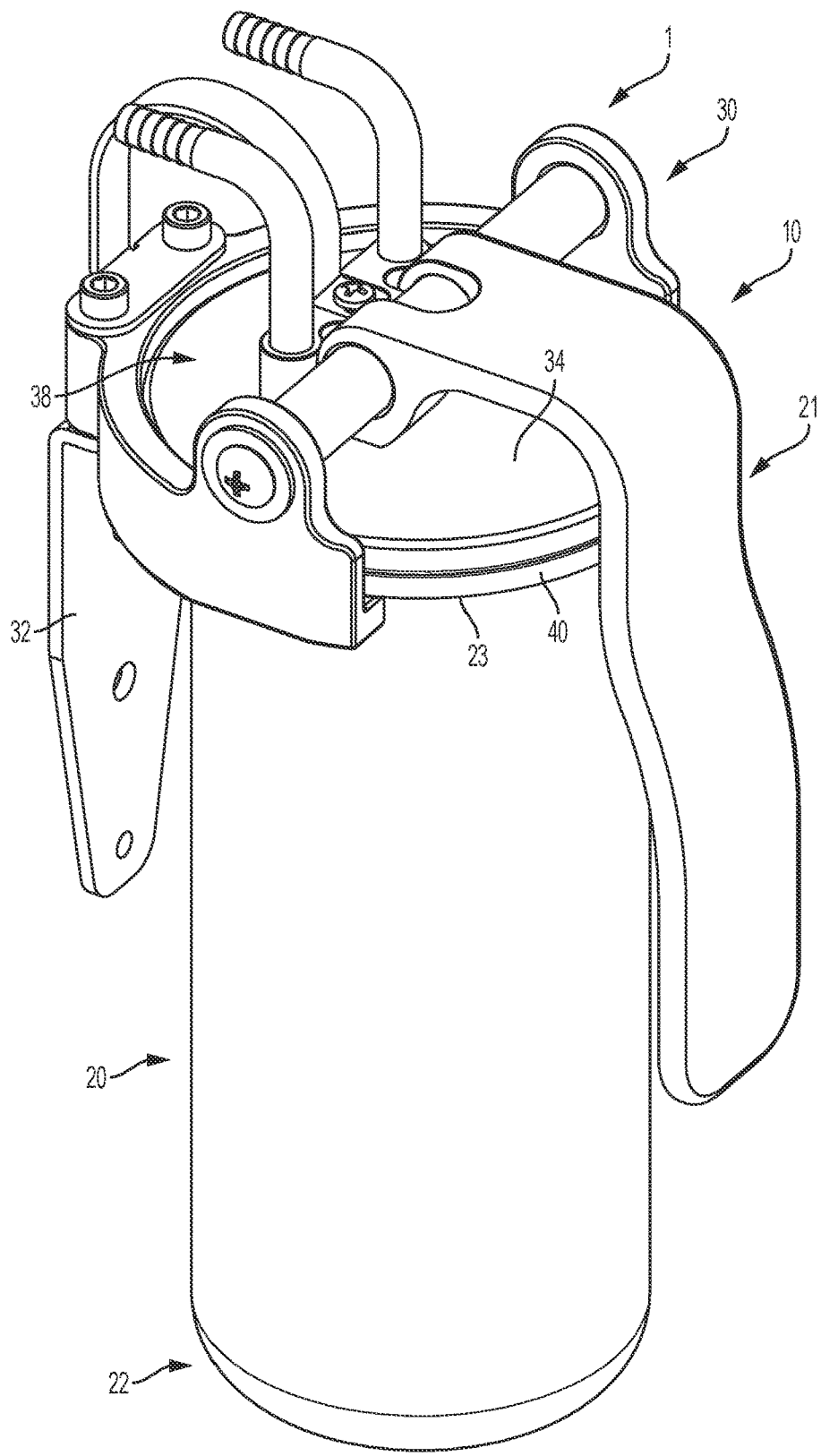
FIG. 2 is an example vessel and closure mechanism.

Referring to FIG. 2, the gas injection assembly 10 includes a container or vessel 20 and a closure mechanism 30. The vessel 20 is configured to receive the liquid into which the gas is injected. The vessel 20 has an open end 21 and an opposite closed end 22. The vessel 20 can be transparent such that the operator can view the solution contained by the vessel 20. A peripheral flange 23 extends radially and peripherally around the open end 21. In certain examples, the vessel 20 can be a pressure vessel.

The closure mechanism 30 has a retainer 32, a top cap 34, and a clamping mechanism 38. Reference is made to the above incorporated pending U.S. patent application Ser. No. 15/138,643 filed on Apr. 26, 2016 for further description of the closure mechanism 30 and related components. A flexible seal 40 is configured to cover the open end 21 of the vessel 20. The clamping mechanism 38 clamps the top cap 34 onto the open end 21 of the vessel 20 such that the flexible seal 40 is sandwiched between the top cap 34 and the open end 21 of the vessel 20.

Referring to FIGS. 3 and 4, the gas injection assembly 10 defines a flow channel 42 that conveys a liquid from an upstream inlet 43 configured to receive the liquid to a downstream outlet 44 configured to dispense the solution. The flow channel 42 has an inner perimeteral surface 46 that extends along an axis 47. The flow channel 42 can be defined by tubing or piping 48 and/or a gas injection device 50 (described further herein). As depicted in FIGS. 3 and 4, the solution is dispensed from the downstream outlet 44 into a second vessel 28 which is configured to receive and/or contain the solution. The second vessel 28 can be a cup or other suitable container which can be delivered to a consumer. A nozzle or valve (not shown) can be included to selectively control the flow of the solution (i.e. an operator can activate flow of the solution by opening the nozzle or valve). In other alternative examples, the solution can be dispensed back into the vessel 20.

Figure 5:
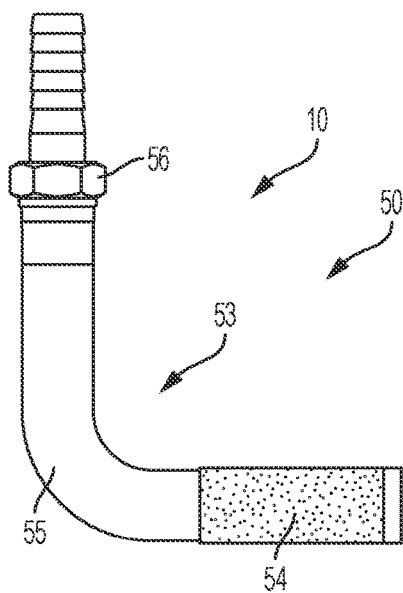
FIG. 5 is an example sparger.
Figure 6:
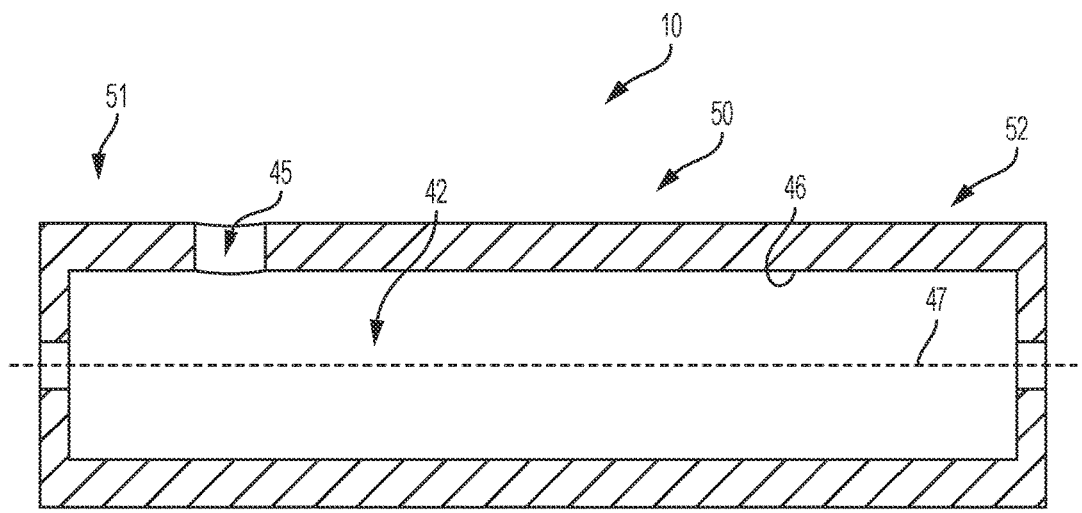
FIG. 6 is a cross section view of an example gas injection device.
Figure 7:
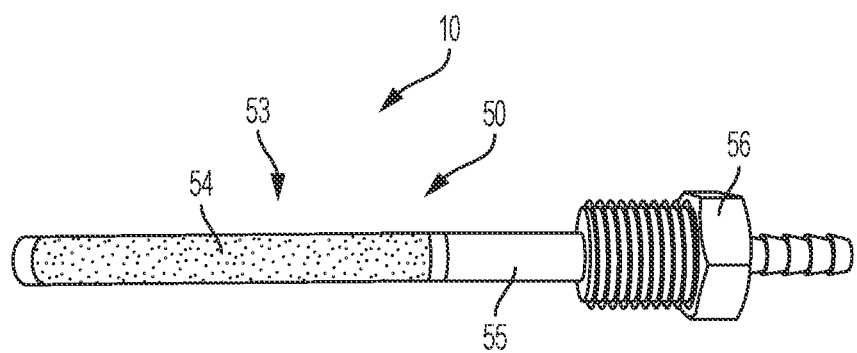
FIG. 7 is another example sparger.
Figure 8:
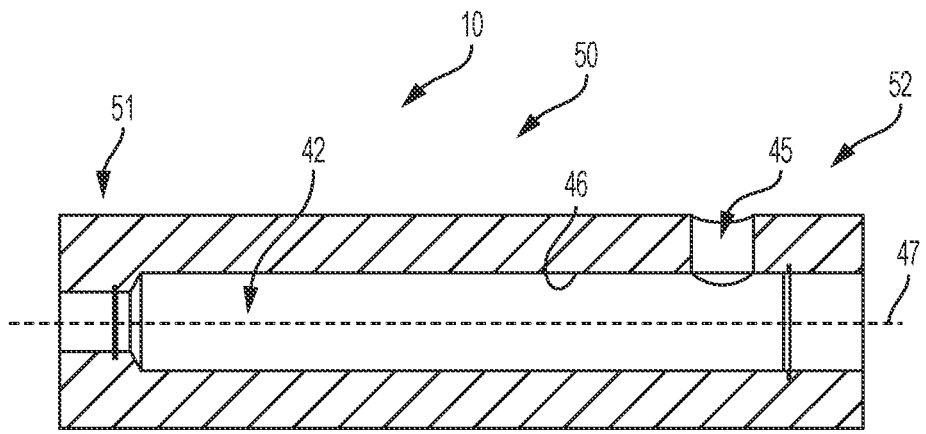
FIG. 8 is a cross section view of another example gas injection device.

The gas injection assembly 10 includes the gas injection device 50 that injects the gas into the liquid to form the solution having a selected ratio of liquid and gas. The gas injection device 50 defines a hole 45 that extends transversely to the flow channel 42. The hole 27 includes a connector member (not shown), such as screw threads, quick disconnect device, or the like. The gas injection device 50 includes an injector or sparger 53 (described herein) for injecting the gas into the liquid. Reference is made to FIGS. 5 and 7 which depict example spargers and FIGS. 6 and 8 which depict cross sectional views of example gas injection devices 50 without the sparger 53.

Referring to FIGS. 5 and 7, the sparger 53 has a connector member 56, a porous surface 54, and a non-porous surface 55. The sparger 53 is received in the hole 45 such that the sparger 53 is positioned in the flow channel 42 (see FIG. 3). The connector member 56 of the sparger 53 couples to the connector member of the hole 45. The connector member 56 can be any suitable connector member such as friction joints, adhesive, screw threads, quick disconnect devices, and the like. In one example, the sparger 53 includes screw threads that engage or mate with screw threads of the hole 27. The porous surface 54 is configured to inject the gas into the liquid through the porous surface 54 as the liquid flows or conveys across the porous surface 45. The porous surface 54 is concentric with the inner perimeteral surface 46. Careful selection of the distance between the porous surface 54 and the inner perimeteral surface 46 allows for repeatably consistent injection of gas into the liquid. The distance between the porous surface 54 and the inner perimeteral surface 46 optimally ranges from 1/16 and 1/2 inches (e.g. the porous surface and the inner perimeteral surface are spaced apart a distance of 1/16 inches). The porous surface 54 is stainless steel expanded mesh having a plurality of pores having diameters between 0.2 and 5.0 microns such that the bubble size of the gas in the solution in consistent. In certain examples, the sparger 53 is tapered from upstream to downstream.

Referring back to FIGS. 3 and 4, the closure mechanism 30 includes a top cap 34 that defines an intake passageway 35 (see FIG. 11) configured to convey the liquid from the vessel 20 to the upstream inlet 43. In alternate examples of the gas injection assembly 10 (such as examples that dispense the solution back into the vessel 20), the top cap 34 defines a dispensing passageway 36 (see FIG. 11) configured to convey the liquid from the downstream outlet 44 back to the vessel 20.

The gas injection assembly 10 includes an intake member 60 defining a central bore 61 (see FIG. 9) that is configured to convey the liquid from the vessel 20 to the intake passageway 35 defined by the top cap 34. The intake member 60 includes a first end 62 that couples to the top cap 34 and a second end 63 opposite the first end 62. The second end 63 of the intake member 60 is positioned in the vessel 20 such that the second end 63 of the intake member 60 is located nearer the closed end 22 of the vessel than the open end 21 of the vessel 20. The first end 62 of the intake member 60 is coupled to the top cap 34 with a connection device 64.

In certain alternative examples, the solution is dispensed from the downstream outlet 44 back into the vessel 20. The gas injection assembly 10 can include a dispensing member 65 defining a central bore 66 that is configured to convey the solution from the dispensing passageway 36 to the vessel 20. The dispensing member 65 includes a first end 67 that couples to the top cap 34 and a second end 68 opposite the first end 67. The second end 68 of the dispensing member 65 is positioned in the vessel 20 such that the second end 68 of the dispensing member 65 is located nearer the closed end 22 of the vessel 20 than the open end 21 of the vessel 20. A second connection device (not shown) couples the second end 68 of the dispensing member 65 to the top cap 34. In some examples, the solution can be dispensed back to a secondary outlet or valve (not shown) of the vessel 20. In still further examples, the vessel 20 comprises a first compartment (not shown) that receives the liquid and a secondary compartment (not shown) into which the solution is dispensed.

What is claimed is:

1. A gas injection assembly for injecting a gas into a liquid to form a solution, the gas injection assembly comprising:
   a vessel configured to receive the liquid, wherein the vessel has an open end;
   a top cap on the open end of the vessel and having an intake passageway;
   an intake member defining a central bore, the intake member coupled to the top cap and configured to receive the liquid from the vessel and dispense the liquid to the intake passageway;
   a flow channel having an upstream inlet configured to receive the liquid from the intake passageway and a downstream outlet configured to dispense the solution; and
   a sparger having a porous surface positioned in the flow channel, wherein the sparger is configured to inject the gas through the porous surface into the liquid to thereby form the solution.

2. The gas injection assembly according to claim 1, wherein the vessel has a closed end, and wherein the intake member has a first end coupled to the top cap and a second end opposite the first end; and
   wherein the second end of the intake member is positioned in the vessel and located nearer the closed end of the vessel than the open end of the vessel.

3. The gas injection assembly according to claim 2, wherein the top cap has a connection device that permits the first end of the intake member to be removably coupled to the top cap.

4. The gas injection assembly according to claim 1, wherein the flow channel has a center axis along which the sparger extends, and wherein the liquid flows under laminar flow conditions across the porous surface of the sparger.

5. The gas injection assembly according to claim 4, wherein the flow channel has an inner perimeteral surface spaced apart from the porous surface, and wherein the porous surface and the inner perimeteral surface are concentric about the center axis.

6. The gas injection assembly according to claim 5, wherein the porous surface and the inner perimeteral surface are spaced apart a distance of 1/16 inches.

7. A gas injection assembly for injecting a gas into a liquid to form a solution, the gas injection assembly comprising;
   a vessel configured to receive the liquid;
   a flow channel having an upstream inlet configured to receive the liquid from the vessel and a downstream outlet; and
   a sparger having a porous surface positioned in the flow channel, wherein the sparger is configured to inject the gas through the porous surface into the liquid to thereby form the solution; and
   wherein the downstream outlet is configured to dispense the solution back into the vessel.

8. The gas injection assembly according to claim 7, further comprising a top cap on the vessel and having a dispensing passageway configured to receive the solution from the downstream outlet and dispense the solution back into the vessel.

9. The gas injection assembly according to claim 8, further comprising a dispensing member configured to receive the solution from the dispensing passageway and dispense the solution back into the vessel.

10. The gas injection assembly according to claim 9, wherein the vessel has a closed end, and wherein the dispensing member has a first end coupled to the top cap and a second end opposite the first end; and
    wherein the second end of the dispensing member is positioned in the vessel and located nearer the closed end of the vessel than the open end of the vessel.

11. The gas injection assembly according to claim 10, wherein the top cap has a connection device that permits the first end of the intake member to be removably coupled to the top cap.

12. A gas injection assembly for injecting a gas into a liquid to form a solution, the gas injection assembly comprising:
    a first vessel configured to receive the liquid, the first vessel having an open end and a closed end;
    a second vessel having an open end and a closed end;
    a top cap on the open end of the first vessel and having an intake passageway;
    an intake member defining a central bore and having a first end coupled to the top cap and a second end opposite the first end, wherein the second end is configured to receive the liquid from the first vessel and the first end is configured to dispense the liquid to the intake passageway, and wherein the second end is positioned in the first vessel and located nearer the closed end of the first vessel than the open end of the first vessel;
    a flow channel having a upstream inlet configured to receive the liquid from the intake passageway and a downstream outlet configured to dispense the solution into the second vessel; and
    a sparger having a porous surface positioned in the flow channel, wherein the sparger is configured to inject the gas through the porous surface into the liquid to thereby form the solution.

13. The gas injection assembly according to claim 12, wherein the flow channel has a center axis along which the sparger extends, and wherein the liquid flows under laminar flow conditions across the porous surface of the sparger.

14. The gas injection assembly according to claim 13, wherein the flow channel has an inner perimeteral surface spaced apart from the porous surface, and wherein the porous surface and the inner perimeteral surface are concentric about the center axis.

15. The gas injection assembly according to claim 14, wherein the porous surface and the inner perimeteral surface are spaced apart a distance of 1/16 inches.

16. The gas injection assembly according to claim 15, wherein the top cap has a connection device that permits the first end of the intake member to be removably coupled to the top cap.

* * * * *